No. 710,916. Patented Oct. 7, 1902.
W. J. KNOX.
LINING FOR CONVERTERS OR FURNACES.
(Application filed Apr. 8, 1902.)
(No Model.)
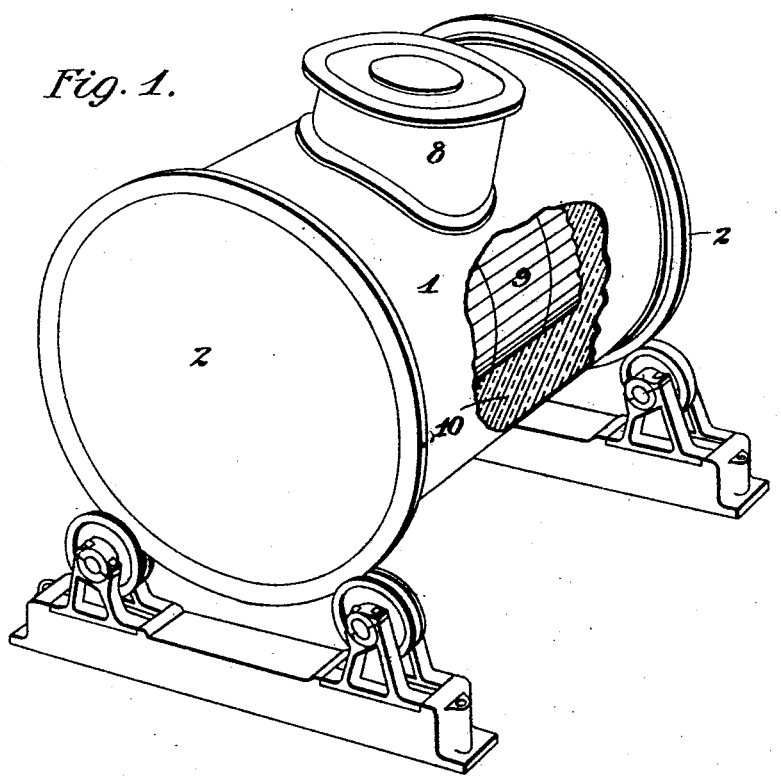
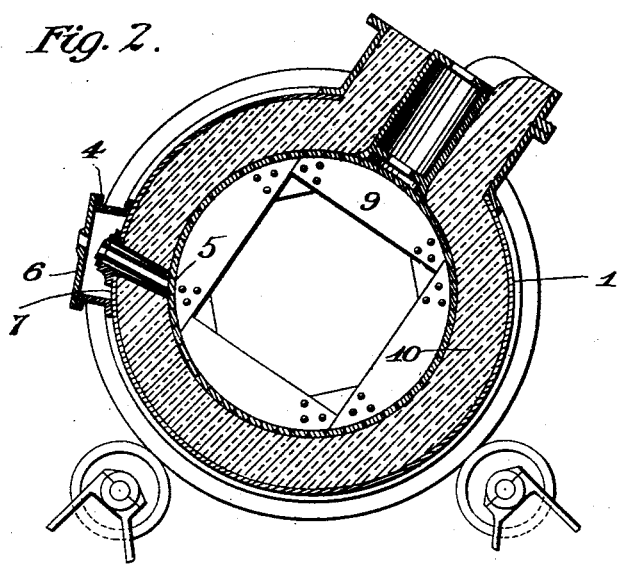

UNITED STATES PATENT OFFICE.

WILLIAM JOHN KNOX, OF EDGEWOOD, PENNSYLVANIA, ASSIGNOR TO GEORGE WESTINGHOUSE, OF PITTSBURG, PENNSYLVANIA.

LINING FOR CONVERTERS OR FURNACES.

SPECIFICATION forming part of Letters Patent No. 710,916, dated October 7, 1902.

Original application filed November 11, 1901, Serial No. 81,812. Divided and this application filed April 8, 1902. Serial No. 101,896. (No specimens.)

*To all whom it may concern:*

Be it known that I, WILLIAM JOHN KNOX, a citizen of the United States, and a resident of Edgewood, in the county of Allegheny and State of Pennsylvania, have invented certain new and useful Improvements in Linings for Converters or Furnaces, of which the following is a specification.

My invention relates to the linings of furnaces, converters, and other vessels used for melting or reducing mattes and other materials or containing molten materials.

The invention is particularly applicable to furnaces and converters used for treating mattes and refining metals; but it is also applicable to various other uses, as will appear.

For convenience of description the invention will be more particularly described in connection with furnaces and converters used for treating copper mattes.

In certain classes of metallurgical operations it has been customary to use so-called "basic" linings containing but a small percentage of silica. These have been formed usually by mixing together in a more or less finely-divided state magnesite or dolomite and basic slag containing considerable silica. These materials having been mixed are packed against the brick lining of the furnace and afterward dried and heated gradually to such a temperature as to cause the silica present to unite with the surfaces of the basic particles by fluxing therewith, and thus form a binder, holding the particles of the lining together more or less firmly. When such a lining is subjected to the action of the molten masses in the operation of the vessel, it is found that the lining itself will disintegrate, and after a relatively small number of operations it is necessary to repair or renew the lining. In some cases it is also customary to use a preliminary binding material of tar or other organic material. Such binder is, however, destroyed by the oxidizing action of the flame and is intended merely to hold the particles in position until they have become more or less solidified by the drying and heating. The expense of renewing and repairing such linings forms a considerable item in the process of treating matte, and a durable lining capable of withstanding the destructive and corrosive actions of the bath and changes of temperature is an article which has long been sought for as being of immense value in metallurgical purposes. I have found that a lining made by the process described in this specification fulfils these requirements.

The process whereby I form my lining may be generally described as follows: A converter or furnace or other vessel of any well-known usual construction having been prepared for receiving the lining is provided, if necessary, with a temporary internal wall, leaving a space to be filled with the refractory lining, and this space is then filled with a mixture composed principally of a suitable basic material—such, for instance, as magnesite or chromite (chromium oxid) or any other basic refractory oxid—and a material which I term "oxysulfid of iron" and the nature and source of which will be presently described. These materials are first ground into a comparatively fine condition and thoroughly mixed together in a dry state, and a small percentage of what is commonly known as "water-glass"—that is to say, a soluble silicate of soda—is added thereto, together with a sufficient amount of water to make the mass slightly plastic. The proportion of water-glass added is approximately such an amount as will give the resulting mass from two to three per cent. of silica, although this may be varied within a considerable range. It should be observed that it is necessary that the oxids used shall be of such a nature or so treated as not to become hydrated or slaked by water. For example, lime would not be suitable, as the water in the water-glass or the extra water that it might be necessary to add to make the mass sufficiently plastic would cause the lining to slake and swell. The plastic mass thus formed is packed tightly against the outer wall of the vessel. For instance, I have obtained good results by packing it between a temporary inner lining and the outer wall by means of a pneumatic rammer. After the lining has been placed in position the excess moisture is allowed to evaporate, leaving the material in such condition as to be capable of absorbing a solution of calcic chlorid, which is then applied to the inner surface. A convenient process of applying this solution consists in spraying it against the surfaces until the mass is saturated therewith. It should be borne in mind that only the excess of moisture is to be dried out at this point, for if the lining should be thoroughly dried—as, for example, by using the heat of a gas or wood fire or even by long thorough drying in the atmosphere—the water-glass would become dried or set and assume the nature of ordinary glass and become incapable of uniting with the calcic chlorid. It is therefore desirable that there be left in the mass a small amount of moisture. This will not interfere with the soaking in of the calcic chlorid, as it will penetrate freely by osmotic action and displacement of any such moisture. The action of the calcic chlorid is to combine with the small amount of silica of the silicate of soda and form calcium silicate and sodium chlorid. It may be noted that the formation of the sodium chlorid is incidental to the formation of the calcic silicate. The depth to which this action takes place depends upon the depth to which the calcic chlorid has been caused to penetrate, and it may be entirely through the lining, if desired, although this is not always necessary. The excess of moisture is then thoroughly dried out. The calcic chlorid forms a deposit of minute crystals of calcium silicate upon and between the other particles composing the lining material, thus forming a very tenacious, tough, and durable lining capable of withstanding the actions to which it is subjected in the operation of the vessel.

It should be noted that this lining is thoroughly cemented together and is practically in its final condition before being subjected to any very high temperature, and little or no change takes place in its condition under the influence of high temperatures developed in the subsequent operations for which the vessel is used. The basic linings formed with basic slag formed according to the former processes referred to do not become cemented together until they have become subjected to such high temperatures as to cause the silica to be fluxed and unite with the basic materials.

The oxysulfid of iron, to which reference has been made, is such a material as is formed when an oxid of iron is added to a molten sulfid of iron. In practice I have found it convenient to obtain the oxysulfid of iron in the manner described in another application filed by me February 4, 1901, Serial No. 45,969, (Patent No. 692,310, dated February 4, 1902.)

In practice I have lined a converter for reducing copper matte in the most careful manner with the magnesite and basic slag composition and also with a magnesite and tar composition according to the best practices and found that the first heat will materially injure the lining, causing more or less spalling, and at the best have not been able to use such a lining without repairing for more than eight or ten heats and usually less. With a lining prepared by my process herein described I have operated the same converter under like conditions for over one hundred heats without causing any spalling, cutting, or cracking whatever and, in fact, without any apparent injury to the lining.

It should be observed that my improved lining is applied in a very simple and convenient manner, inasmuch as the materials may be handled in a moist cold plastic condition and brought to their final state with the use of little or no extraneous heat, although a moderate amount of heat may, if desired, be used to hasten the drying.

In some cases it may be desired to add calcic chlorid to the basic refractory oxid and oxysulfid-of-iron mixture before applying the lining to the vessel and subsequently saturate the same with the soluble glass. Usually, however, I prefer to add the soluble glass first for the reason, among others, that the calcic chlorid is highly hygroscopic, and it is thus less easy to dry the lining sufficiently to cause the soluble glass to penetrate.

While I usually prefer to mix about twenty-five per cent. of oxysulfid of iron with the basic refractory oxid in the formation of the plastic mass, yet it is possible to modify this process by varying the amount of oxysulfid within wide limits or even entirely omitting it and proceeding with the process in other respects in the same manner as described. Under such circumstances the lining will absorb from the bath when it is used in practice considerable amounts of the molten material which is being treated until the lining becomes saturated with such material.

It is also practicable to apply the lining by forming the described material into blocks or bricks of the proper shape and then build the lining into the vessel.

In the accompanying drawings, Figure 1 is a perspective view, partly in section, of a so-called "converter," showing the process of applying the lining. Fig. 2 is a cross-section of the same.

The figures and the description thereof are given merely as illustrative of the general process, proper modifications being made in applying the lining to other vessels.

Referring to the figures, 1 represents the outer metal shell of the vessel, provided with heads 2 2, secured thereto in any convenient manner. A twyer-box 4 is shown here consisting of a series of openings 5, the inner ends of which terminate within the vessel and the outer ends within a space which may be closed by a plate or cover 6. Access to the twyers is obtained by removing the cover in a manner well understood. In practice I have found that water-cooled twyers formed of bronze or other suitable material may be successfully used in connection with my improved lining. The water is caused to circulate through spaces 7 in such manner as to keep the temperature within the proper limits. The neck of the converter is represented at 8.

In the drawings, 9 represents a temporary inner lining or support, which may be of wood or other suitable material, leaving a space between itself and the outer wall within which the lining material 10, hereinbefore described, is closely packed in the manner already described.

It will of course be understood that in such vessels as require an additional lining—such, for instance, as clay, brick, or other material—between the outer shell and the inner lining the operation is essentially the same, such additional lining being placed in position in the usual manner.

The general process of manufacturing a lining of this character is described in my application, Serial No. 75,440, filed September 16, 1901.

I claim as my invention—

1. A material for lining vessels, consisting of a mixture of basic refractory oxid, oxysulfid of iron, and calcic silicate.

2. A material for lining vessels for metallurgical purposes, consisting of magnesite in combination with calcic silicate, and an iron compound.

3. A lining for metallurgical vessels consisting of a basic refractory material, calcic silicate and sodium chlorid.

4. A binding material for metallurgical vessel-linings consisting of calcic silicate and sodium chlorid, in combination with a refractory lining material.

Signed at Copperfield, in the county of Orange and State of Vermont, this 3d day of April, A. D. 1902.

WILLIAM JOHN KNOX.

Witnesses:
T. F. SEAMAN,
H. S. STEUART.